Aug. 10, 1954 K. B. KAISER 2,685,823
MECHANISM FOR FACILITATING THE DETACHABLE
MOUNTING OF ROTARY DEVICES
Filed Feb. 24, 1951 4 Sheets-Sheet 3
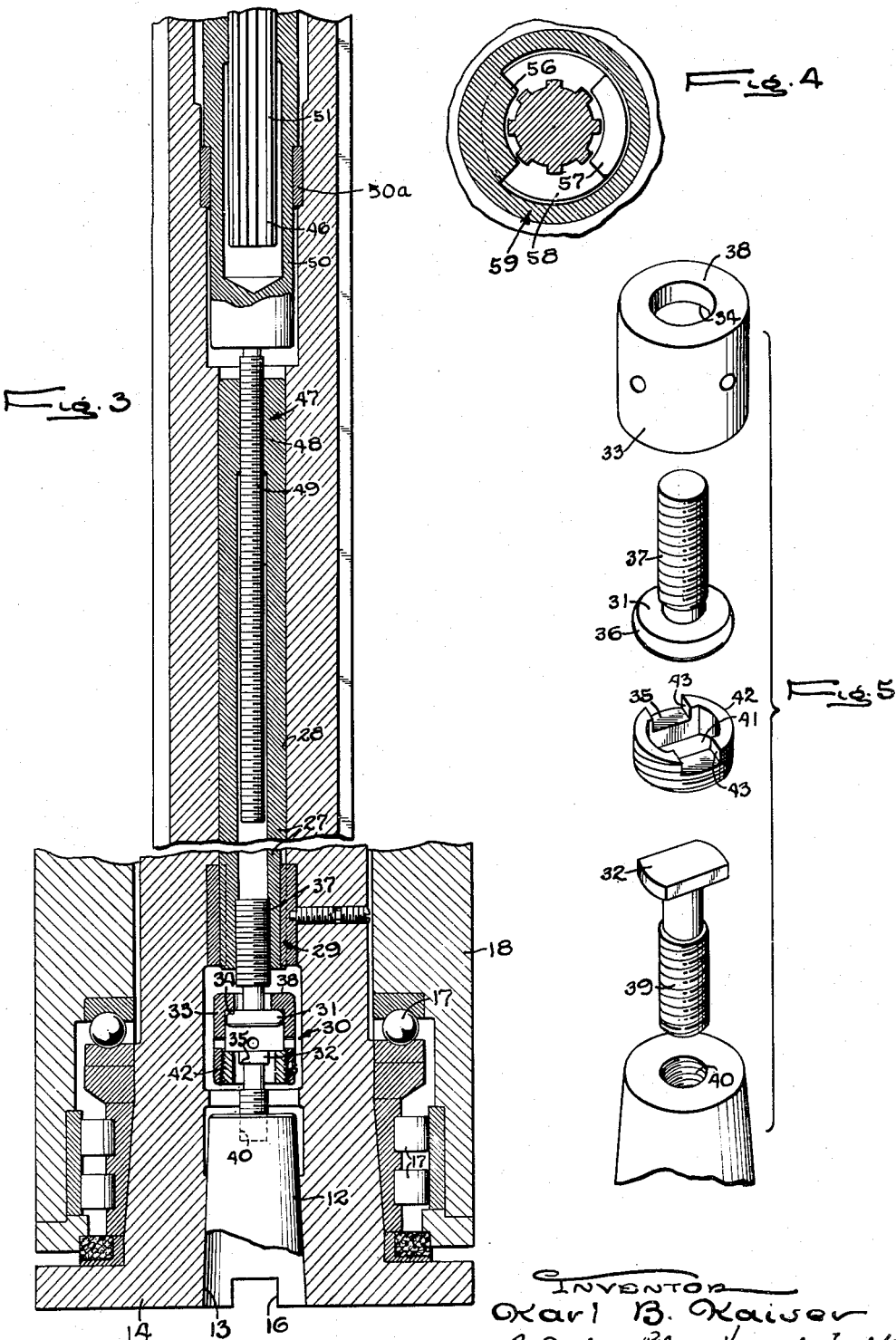
INVENTOR
Karl B. Kaiser
By Carlson, Pilzner Hussard + Wolfe
ATTORNEY Aug. 10, 1954    K. B. KAISER    2,685,823
MECHANISM FOR FACILITATING THE DETACHABLE
MOUNTING OF ROTARY DEVICES
Filed Feb. 24, 1951    4 Sheets-Sheet 4
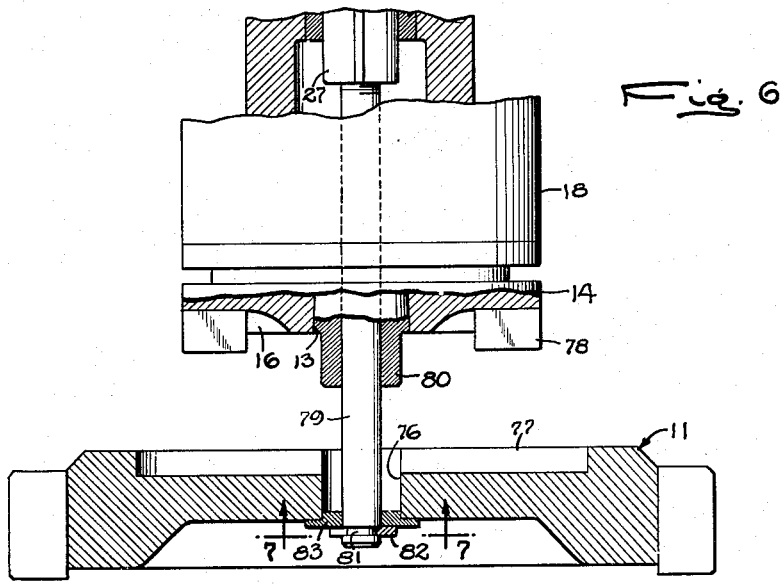
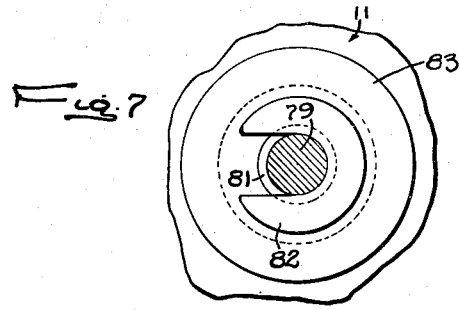
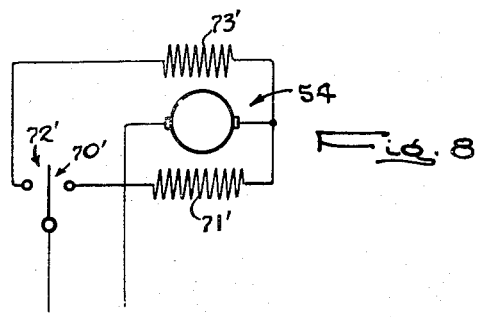
INVENTOR
Karl B. Kaiser
By Carlson, Pitzner, Hubbard & Wolfe
ATTORNEY Patented Aug. 10, 1954

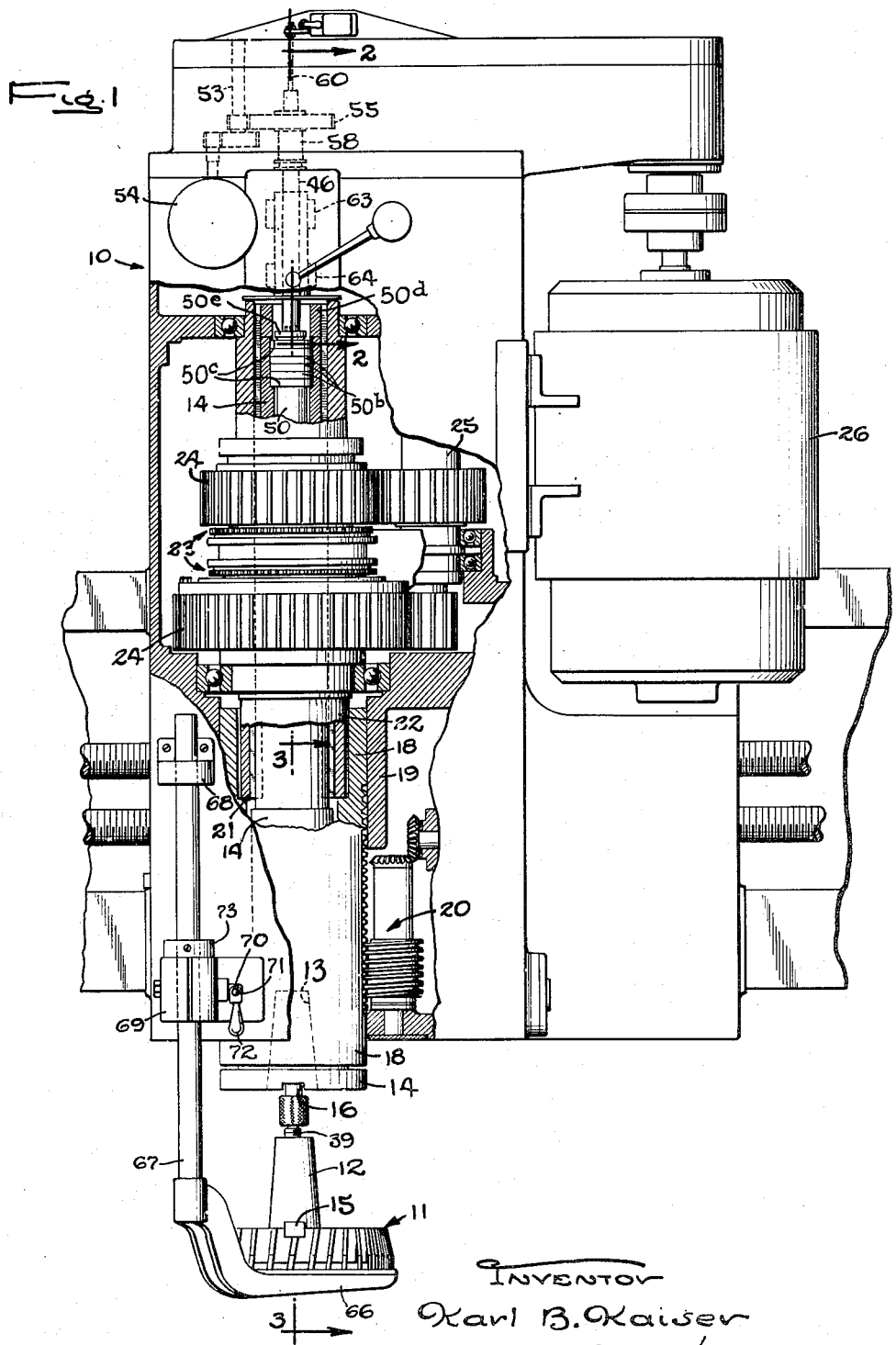

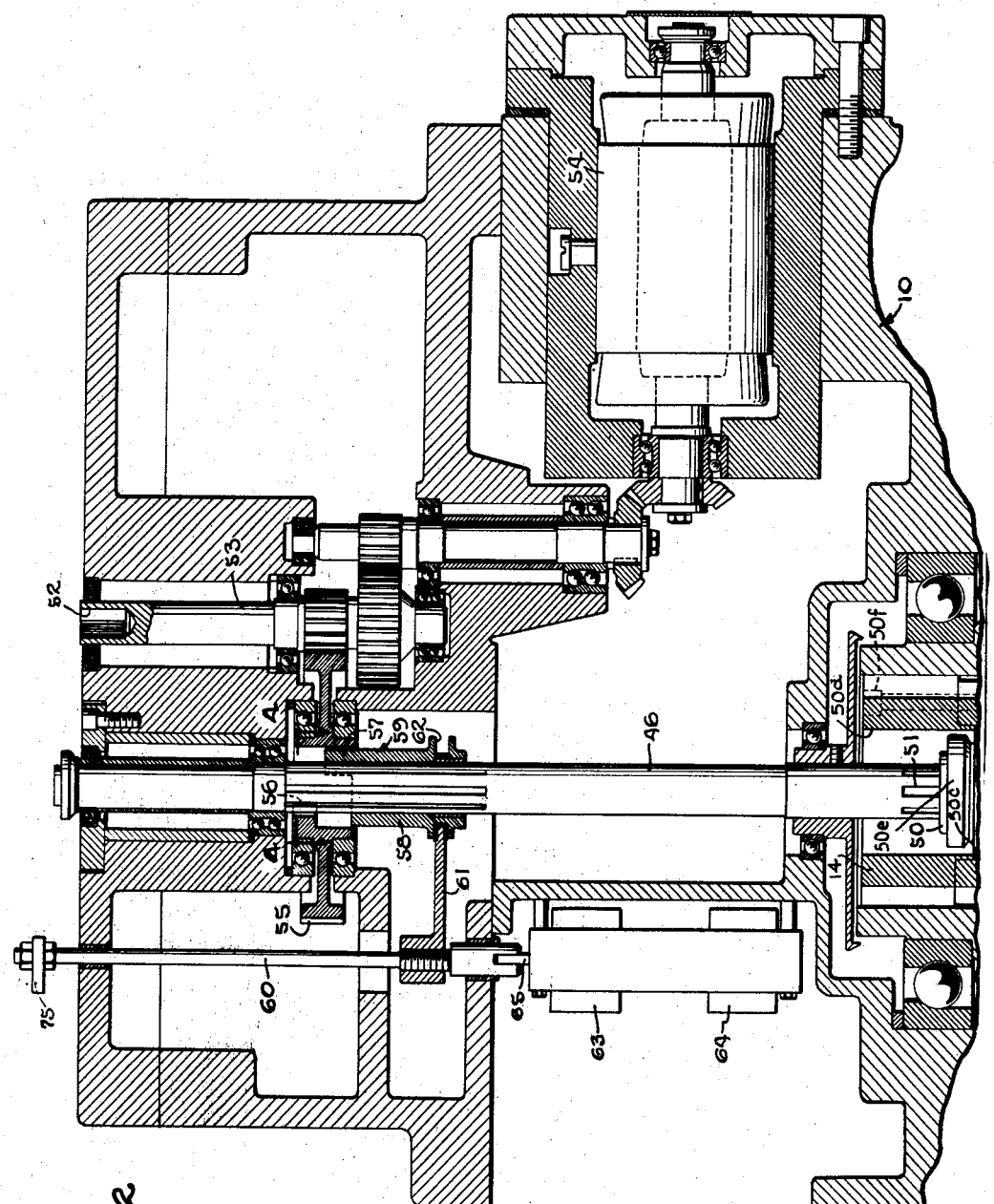

2,685,823

UNITED STATES PATENT OFFICE 2,685,823

MECHANISM FOR FACILITATING THE DETACHABLE MOUNTING OF ROTARY DEVICES

Karl B. Kaiser, Rockford, Ill., assignor to The Ingersoll Milling Machine Company, Rockford, Ill., a corporation of Illinois Application February 24, 1951, Serial No. 212,532

11 Claims. (Cl. 90—11)

This invention relates to the construction of a rotary spindle to facilitate the mounting thereon or detachment therefrom of a device to be rotated by the spindle. The attachment of a heavy rotary device such as a cutter to a milling machine spindle, is a prolonged operation and often requires the services of two workmen. One holds the cutter against the lower end of the spindle while the other workman, after climbing to the top of the spindle, tightens a nut on a long tie bolt extended down through the spindle and threaded into the end of the tapered cutter shank. Release of the wedged shank is even a more difficult and time-consuming operation.

The primary object of the present invention is to provide a novel mounting which requires the services of only one man in removing the rotary device from or replacing the same on the spindle, which is adapted for power actuation both in attaching the device to and releasing the same from the spindle, which is safer and faster in operation, and which is usable with standard shank constructions.

Another object is to provide a novel mounting by which a coupling member may be projected outwardly from the spindle end, connected to the device to be supported, and then retracted into the spindle to draw the parts into mating relation.

A further object is to actuate the coupling member through a novel power transmitting connection which is extended into the end of the spindle remote from the supported device.

Still another object is to provide a novel type coupling which permits of quick attachment to and detachment from the device to be supported.

A fourth object is to reciprocate the retractible clamping member by a power actuated screw mechanism arranged in a novel manner within the hollow spindle.

The invention also resides in the novel construction of the mechanism for actuating the clamping screw and in the manner of releasing the wedging action preparatory to detaching the rotary device from the spindle.

Other objects and advantages of the invention will become apparent from the following detailed description taken in connection with the accompanying drawings, in which Figure 1 is a fragmentary elevational view of a tool head incorporating the improved mounting and partially broken away to show certain of the parts in section.

Fig. 2 is a fragmentary section taken along the line 2—2 of Fig. 1.

Fig. 3 is a fragmentary sectional view taken along the line 3—3 of Fig. 1.

Fig. 4 is a section taken along the line 4—4 of Fig. 2.

Fig. 5 is an exploded perspective view of the detachable coupling.

Fig. 6 is a fragmentary longitudinal sectional view of a modified form of the invention.

Fig. 7 is a section taken along the line 7—7 of Fig. 6.

Fig. 8 is a wiring diagram.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

For purposes of illustration the invention is shown in the drawings incorporated in the head 10 of an adjustable rail milling machine adapted to utilize a cutter 11 carried on the end of a tapered shank 12 which, in the operating position of the cutter, is drawn into a mating tapered recess 13 in the lower end of an elongated hollow spindle 14. With the shank thus wedged, the spindle is coupled to the cutter by a key 15 received in slots 16 on the end flange of the spindle. The latter projects through and is journaled in spaced bearings 17 in a quill 18 which slides in a cylindrical part 19 of the head 10 in which the quill may be adjusted axially through the medium of a power actuated worm and rack 20. The spindle extends through and is spline coupled at 21 to a drive sleeve 22 which, through clutches 23 and speed change gears 24 may be coupled to a shaft 25 driven by the spindle drive motor 26 on the head 10.

In accordance with the present invention, a member 27 mounted within the spindle and projectable outwardly from the lower end thereof is adapted to be connected through a quickly engageable and disengageable coupling 30 to the end of the cutter shank 12 and then retracted into the spindle to draw the shank inwardly so as to seat the same firmly in the recess 13 with the keys 15 in register with the notches 16. Herein, the member 27 is an elongated sleeve slidable endwise in a bore 28 with its lower end portion spline coupled at 29 to the spindle 14.

While the coupling 30 may take various forms, the preferred form shown in Figs. 3 to 5 is of the bayonet type formed of parts which will telescope with each other when moved axially while in one angular position but which are, in another angular position, adapted for abutting engagement and thus connected for axial movement together. In the present instance, the coupling includes two heads 31 and 32 rigid with the member 27 and the shank 12 respectively and enclosed by a cup 33 having opposed abutments 34 and 35 which are engageable with the heads 31 and 32. The head 31 is a disk fast on a shank 37 which is screwed into the end of the lifting or clamping member 27 and is beveled around its periphery as indicated at 36 to permit some degree of rocking of the head within the cup. An inturned flange 38 on the latter defines the abutment 34 and is apertured to receive the shank 37. The cup 33 is thus freely rotatable relative to the member 27.

In a similar way, the other head 32 is formed on a shank 39 which is threaded to screw into the hole 40 usually formed in the end of a standard cutter shank. This head is flattened or otherwise made non-circular and sized to pass loosely through an oblong hole 41 in a ring 42 threaded into the lower end of the cup 33 and locked therein by a set screw. The top or inner end of the ring is formed with notches 43 adapted to receive opposite end portions of the head 32 when the latter, after passing through the ring hole in one angular position shown in Fig. 5, is turned through a quarter revolution. The bottoms of the notches 43 thus form the lower abutment 35 of the coupling 30.

It will be observed that the cup 33 with the ring 42 therein and head 32 form a quickly engageable and disengageable bayonet connection by which the cutter shank 12 while supported below the spindle end may be picked up, drawn upwardly, and properly seated in the tapered recess 13. In accordance with another aspect of the invention, the lifting member 27 and its power actuator are utilized to release the wedged cutter shank from the spindle and then support the cutter while it is lowered out of the spindle to render the coupling accessible for detachment and removal of the cutter. To this end, one of the elements of the bayonet coupling is mounted on its support with enough axial lost motion to permit the power actuated member 27 to move downwardly and come into direct abutment with a part rigid with the shank 12. As a result, the member 27 and the associated parts of the power actuator may gain momentum in the initial downward movement and strike the shank with sufficient force to dislodge it from the recess 13.

Herein, the lost motion is interposed between the cup 30 and the head 31 by spacing the flange 38 and the ring 42 apart a distance somewhat greater than the height of the head 31. Thus, as the member 27 is advanced downwardly with the parts in the wedged position shown in Fig. 3, the head 31 moves out of abutment with the cup flange 38 and, after the slack in the lost motion connection has been taken up, strikes the head 32 thus applying a hammer blow to the shank 12. Upon such release of the shank, the cutter falls downwardly a short distance equal to the lost motion but remains suspended from the member 27, the cup flange 38 then engaging the head 31.

Raising and lowering of the member 27 to seat or release the cutter shank 12 and also retain the shank wedged in the spindle is preferably effected by a screw mechanism 47 disposed within the hollow spindle 14 and actuated by the rotation of a shaft 46 which extends upwardly through the spindle above the upper end thereof and is adapted to be driven by a reversible power actuator built into the upper part of the tool head 10. Herein, the lifting member 27 constitutes the nut of the screw mechanism and, for this purpose, is formed as a sleeve internally threaded at its upper end 48 (Fig. 3) to receive a screw 49 having a hollow upper end portion or sleeve 50 internally spline grooved to mate with the fluted lower end 51 of the drive shaft 46. The sleeve 50 on the screw is journaled at its lower end in a bearing 50$^a$ (Fig. 3) disposed between opposed shoulders on the spindle 14 and sleeve 50. At its upper end (see Fig. 1), the sleeve is suspended from the spindle 14 through the intermediary of bearings 50$^b$ clamped to the sleeve by a nut 50$^c$ and disposed between internal shoulders 50$^c$ on the spindle. The upper one of these shoulders is on a ring 50$^d$ (Fig. 2) which is secured to the end of the sleeve by screws 50$^f$.

By turning the shaft 46 in opposite directions, the nut 27 may be raised or lowered as desired. The power actuator herein shown for turning the shaft 46 includes an electric motor 54 (Fig. 2) geared to an upright shaft 53 which is journaled in the tool head and carries a pinion meshing with a gear 55 whose hub is formed with an inwardly projecting arcuate jaw 56 (Figs. 2 and 4). The latter is adapted for engagement with a jaw 57 projecting from the upper end of a sleeve 58 slidably splined on the upper fluted end of the screw shaft 46. The toothed gear 55 and sleeve thus form a jaw clutch 59 by which the shaft 46 may be disconnected from the motor 54 when the clutch is disengaged as shown in Fig. 2 or coupled to the motor when the sleeve 58 is raised to bring the jaw 57 into the path of the driving jaw 56.

The clutch may be actuated by manual shifting of a rod 60 slidable on the tool head and carrying a yoke arm 61 received in an outwardly opening groove 62 in the sleeve 58. Alternatively, the clutch sleeve may be shifted to engage or release the clutch by selective energization of solenoids 63 and 64 whose common armature 65 is suspended from the lower end of the shifter rod 60. When the clutch is disengaged, it will be apparent that the parts of the cutter lifting or releasing mechanism as above described turn with the tool spindle 14. This mechanism does not therefore interfere in any way with the normal operation of the cutter or its drive spindle.

As shown in Fig. 4, the jaws 56 and 57 are constructed to provide a substantial amount of lost motion within the clutch, the parts of which engage with considerable impact for releasing the wedging action on the screw mechanism preparatory to removing a cutter from the spindle. For this purpose, there is only one jaw on each clutch element and each jaw is of relatively short circumferential length. Thus, when the clutch sleeve is shifted to engage the clutch while the motor 54 is running, the jaws 56 and 57 will come into full engagement with a hammer blow capable of overcoming the friction by which the screw and nut are wedged together.

Provision may be made for actuating the screw shaft 46 manually under emergency conditions. To this end, the shaft 53 of the motor actuator is extended to the top of the tool head 10 and formed at its end with a socket 52 in which a suitable hand crank may be inserted.

The cutter to be mounted on the spindle 14 may be supported temporarily beneath the spindle on a horizontal arm 66 (Fig. 1) rigid with and projecting laterally from a rod 67 slidable vertically in lugs 68 and 69 projecting from the exterior of the tool head 10. The lug 69 is split and adapted to be collapsed by a hand cam 70 which is pivoted at 71 on the tool head and rigid with a handle 72. The support 66 may thus be held in any desired position of vertical adjustment. The support while free to swing horizontally may be held at any desired height by a collar 73 adjustably secured to the rod as by a set screw. If desired, provision may be made for raising and lowering the rod 67 by a power actuator driven hydraulically or otherwise.

In the use of the above described cutter mounting mechanism, the cutter to be attached to the spindle 14 and having the head 32 screwed into its shank 12 is first centered on the support 66 and then swung laterally to locate the cutter beneath the lower end of the spindle 14 with the shank 12 alined with the spindle axis as shown in Fig. 1. The clutch 59 is engaged by energizing the solenoid 63 and by closure of a switch 70' (Fig. 8) the high torque winding 71' is energized to start the motor in a direction to project the clamping member 27 downwardly. As the cup 33 approaches the head 32 on the cutter shank, it is turned manually to aline the recess 41 with the head thus allowing the ring 42 to pass down over the head. The motor is then stopped and, after turning the cup to bring the ends of the head 32 into alinement with the notches 35, the motor is started in the reverse direction by closure of a switch 72' in the circuit of the winding 73'. This circuit is designed to produce a lower output torque than when the motor is energized through the winding 71'.

The parts of the bayonet connection then engage as shown in Fig. 1 and, in the continued turning of the screw 49, the cutter is lifted off from the support 66 and the shank 12 enters the spindle socket 13. As the cutter approaches the end of the spindle, it may be turned manually in either direction to aline the keys 15 with the spindle slots 16 and thus allow the cutter to become coupled properly with the spindle end. The swiveled mounting of the cup 33 on the head 31 permits such angular adjustment.

The motor operating at the lower torque, stalls as the shank becomes fully seated in the recess 13 and thus clamped in the spindle end. The clutch 59 may then be disengaged by energizing the solenoid 64 thus disconnecting the shaft 46 from the motor and gearing so that the parts of the elevating mechanism may rotate with the spindle in the normal use of the cutter during which the cutter is held seated by virtue of the irreversible character of the screw and nut clamp. Such disengagement of the clutch may be effected by depressing a handle 75 (Fig. 2) exposed above the clutch housing.

To remove the cutter, the support 66 is swung in beneath the spindle, the clutch 59 is engaged by energization of the solenoid 63 and, by simultaneous closure of the high torque motor circuit by the switch 70', the motor 54 is started in the downward direction. After a partial revolution, the jaws 56 and 57 of the clutch will engage with a substantial impact thus breaking the screw shaft 49 loose from the nut 27 to initiate lowering of the latter. After the lost motion in the bayonet connection has been taken up, the head 31 on the nut 27 will strike the head 32 with sufficient impact to knock the shank 12 loose from the spindle socket. If necessary, the nut 27 may, by proper manipulation of the switches controlling the motor 54, be raised and again lowered to apply additional blows for releasing the wedging action on the shank. After such release, the lowering of the nut is continued until the cutter comes to rest on the support 66 and the cup 33 has continued far enough to carry the notches 35 below the head 42. The latter may be turned to bring the hole 41 into registry with the head 32 after which the nut 27 may be raised by operation of the motor thus separating the parts of the bayonet connection and leaving the cutter on the support 66.

The detachable coupling 30 may take different forms according to the shape of the rotary device 11 to be clamped to the spindle end in the manner above described. For example, the device or cutter 11 may be constructed as shown in Figs. 6 and 7 with a central mounting hole 76 and grooves 77 adapted to interfit with keys 78 on the end of the spindle 14. To mount such a cutter, the upper coupling element 31 may comprise a rod 79 threaded into the lower end of the elevating member 27 above referred to and projecting through a guide tube 80 seated in the recess 13 of the spindle with its lower end projecting from the end of the spindle and sized to fit closely within the hole 76. The lower end of the rod is formed with a groove 81 adapted to receive and interfit with a detachable abutment such as a C washer 82.

To attach the cutter 11 to the spindle 14, the washer 82 is removed from the lower end of the rod 79 and, by operation of the screw 49, the rod is lowered through the hole 76 while the cutter is positioned on the support 66 in alinement with the spindle axis. After the rod end passes through the hole 76, a centering washer 83 is fitted over the rod and seated in the cutter hole. Then, the C washer 82 is slid across the groove 81 to straddle the rod and provide an abutment for supporting the washer 83 and the cutter as shown in Fig. 6. Then, by reversing the rotation of the screw 49, the rod with the cutter attached is raised and finally clamped against the end of the spindle with the keys 78 received in the grooves 77 to provide the necessary drive connection. The above procedure is reversed in order to remove the cutter from the spindle.

It will be apparent that the mechanism above described greatly facilitates the mounting and detachment of heavy cutters, not only saving considerable time and labor but also reducing the hazards of these operations as heretofore practiced.

I claim as my invention:

1. The combination of, a hollow rotary spindle shaped at its end to interfit with a device to be supported on and driven by the spindle, a member mounted within said spindle for movement axially through said end, a coupling for detachably connecting said member and said device, a screw mechanism disposed within said spindle and operable to reciprocate said member into and out of the spindle, said mechanism including a rotary shaft extending into said spindle, a rotary power driven actuator, and a clutch for coupling said actuator to said shaft and having driving and driven elements with jaws thereon interengageable by relative axial movement, there being a substantial amount of angular lost motion between said jaws.

2. The combination of a hollow rotary spindle, a member mounted within said spindle for projection outwardly beyond the spindle end, a coupling detachably connecting said member and a device to be supported on and driven by the spindle, mechanism for reciprocating said member relative to said spindle and frictionally holding said device clamped against the spindle end, said mechanism including a rotary shaft extending outwardly from said spindle, a rotary motor, and a clutch for coupling said motor and said shaft, and having angular lost motion between its interengageable parts to permit the initial driving torque exerted on said shaft to be applied with a sudden impact.

3. The combination of a support, a hollow vertical spindle journaled in said support, a member mounted within said spindle for projection outwardly beyond the lower end of the spindle, a member adapted to be attached to a device to be supported on and driven by said spindle, a coupling detachably connecting said members, and a second support mounted on said first support to swing laterally into and out of a position below and in alignment with said spindle, said second support being adapted to receive and support said device in a position to permit coupling of said members.

4. The combination of a hollow rotary spindle having an outwardly flaring recess for receiving a tool shank, a member mounted within said spindle for projection outwardly through said recess beyond the spindle end, a coupling for detachably connecting said member and said tool shank when spaced outwardly from the spindle end, said coupling including a swivel connection permitting angular adjustment of the shank in either direction while the shank is suspended from said member and being drawn into said recess, and power actuated mechanism for reciprocating said member relative to said spindle to move said coupling outwardly from and retract the same into said recess.

5. A mounting of the character described having, in combination, a hollow rotatable spindle shaped at its end to interfit with a device to be supported, a member disposed within said spindle and movable axially into and out of the outer end thereof to a position spaced beyond the spindle end, a coupling on the end of said member and detachably engageable with a part on said device after projection of the member outwardly to said position, and a screw and nut mechanism within said spindle operable to advance and retract said member.

6. A mounting of the character described having, in combination, a hollow rotatable spindle shaped at its end to interfit with a device to be supported, a member disposed within said spindle and movable axially into and out of the outer end thereof, a coupling on the end of said member and detachably engageable with a part on said device after projection of the member outwardly to a predetermined position, and a reversible power actuator operable to apply forces of different magnitudes to said member to respectively advance and retract said member out of and into said spindle and thereby clamp said device to or release the same from said spindle end, the clamping force being less than the releasing force.

7. A mounting of the character described having, in combination, a hollow rotatable spindle shaped at its end to interfit with a device to be supported, a member disposed within said spindle and movable axially into and out of the outer end thereof, a coupling on the end of said member and detachably engageable with a part on said device after projection of the member outwardly to a predetermined position, a reversible power actuator for said member operable when energized to advance the member out of or retract the same into said spindle end, and means controlling the energization of said actuator to cause a greater force to be applied to the member during retraction than during the advance thereof.

8. In a machine tool head, the combination of, a frame, a tubular quill slidable in and projecting from said frame, a hollow spindle journaled in and projecting through said quill and having an exposed outer end shaped to interfit with a cutter, a power rotated element journaled on said frame and spline coupled to said spindle intermediate the ends thereof and operable to drive the spindle in all positions of said quill, an elongated member splined within said spindle for movement of its outer end axially into and out of the latter between an inner position within the spindle and an outer position spaced beyond the outer end of the spindle, coupling means on the end of said member detachably connectable with said cutter when projected outwardly beyond said spindle end and operable to draw the cutter against the spindle end as the member is retracted into the spindle, screw elements threaded together within said spindle over a length corresponding to the range of movement of said member between said inner and outer positions, one screw element being fast on said member, a part supporting the other screw element and journaled in said spindle, and a power rotated shaft journaled on said frame externally of said spindle and spline coupled to said part in telescoping relation in all of the different axial positions of said quill.

9. In a machine tool head, the combination of, a frame, a hollow spindle journaled in said frame and having an exposed end shaped to interfit with a cutter, a power rotated element journaled on said frame and coupled to said spindle intermediate the ends thereof; a coupling detachably connectable with a cutter to be attached to the spindle, an elongated member supporting said coupling at its outer end and splined within said spindle for movement axially to project and retract said coupling through a predetermined range disposed outwardly beyond the spindle end whereby to draw the cutter coupled thereto inwardly against the spindle end when the member is retracted into the spindle, screw elements threaded together within said spindle over a length corresponding to said range, one element being fast on said member, a part supporting the other screw element and journaled in said spindle, and power rotated means for driving said part selectively in opposite directions.

10. In a machine tool head, the combination of, a hollow rotary spindle adapted to be coupled at one end to a cutter for driving the latter, a member mounted within said spindle for projection outwardly beyond the spindle end, a member detachably connectable with a rotary cutter along the axis thereof, and a coupling joining said members together for limited lost motion relative to each other along said axis and also for rotation in opposite directions about the axis while the cutter is held suspended by the members and coupling, said coupling including a head on one of the members and a cup enclosing and rotatable relative to said head and abutting opposite ends of the head at opposite limits of said lost motion.

11. In a machine tool head, the combination of, a frame, an upwardly extending hollow spindle journaled in said frame and having an exposed lower end shaped to interfit with a cutter for driving the latter, a power rotated element for driving said spindle journaled on said frame and coupled to the spindle intermediate the ends thereof, a coupling detachably connectable with a cutter adapted to be attached to the spindle, a member supporting said coupling at its outer end and splined within said spindle for movement axially to project said coupling outwardly below said lower spindle end or to retract the coupling into the spindle and draw the cutter coupled thereto against the spindle end, screw elements threaded together within said spindle, one element being fast on said member, a part on said spindle held against movement axially thereof and supporting the second screw element to turn relative to said spindle while sustaining the weight of said first screw element and the cutter coupled thereto in different axial positions of the latter, and means exposed beyond the upper end of the spindle for receiving rotary power to be transmitted to said second screw element.

References Cited in the file of this patent

UNITED STATES PATENTS

| Number | Name | Date |
|---|---|---|
| 1,300,163 | Groene | Apr. 8, 1919 |
| 1,794,361 | Armitage et al. | Mar. 3, 1931 |
| 2,052,271 | Archea | Aug. 25, 1936 |
| 2,441,046 | Turrettini | May 4, 1948 |
| 2,557,582 | Turrettini | June 19, 1951 |